United States Patent [19]

Seifried et al.

[11] Patent Number: 4,716,068
[45] Date of Patent: Dec. 29, 1987

[54] POLYPROPYLENE ADHESIVE TAPE

[75] Inventors: Walter Seifried, Weisbaden; Guenther Crass, Taunusstein, both of Fed. Rep. of Germany

[73] Assignee: Hoechst Aktiengesellschaft, Frankfurt am Main, Fed. Rep. of Germany

[21] Appl. No.: 819,631

[22] Filed: Jan. 17, 1986

[30] Foreign Application Priority Data

Jan. 19, 1985 [DE] Fed. Rep. of Germany ....... 3501726

[51] Int. Cl.$^4$ .............................. B32B 3/00; C09J 7/02
[52] U.S. Cl. ...................... 428/141; 428/166; 428/172; 428/216; 428/332; 428/353; 428/354; 428/414; 428/451; 428/516; 428/910; 264/176.1; 264/345; 427/40
[58] Field of Search .............. 428/216, 354, 355, 910, 428/414, 516, 451, 141, 166, 172; 264/176.1

[56] References Cited

U.S. PATENT DOCUMENTS

| 4,348,457 | 9/1982 | Rosenthal et al. | 428/516 |
| 4,414,261 | 11/1983 | Nanbu | 428/354 |
| 4,419,411 | 12/1983 | Park | 428/516 |
| 4,447,485 | 5/1984 | Aritake | 428/354 |
| 4,502,263 | 3/1985 | Crass et al. | 428/354 |
| 4,595,625 | 6/1986 | Crass et al. | 428/215 |

FOREIGN PATENT DOCUMENTS

| 0053925 | 6/1982 | European Pat. Off. . |
| 0093370 | 11/1983 | European Pat. Off. . |
| 3144911 | 5/1983 | Fed. Rep. of Germany . |
| 1416357 | 12/1975 | United Kingdom . |
| 2108008 | 5/1983 | United Kingdom . |

Primary Examiner—P. C. Ives
Attorney, Agent, or Firm—Schwartz, Jeffery, Schwaab, Mack, Blumenthal & Evans

[57] ABSTRACT

Disclosed is an adhesive tape based on a co-extruded, three-layer polypropylene base film which has been biaxially stretch-oriented in at least three stages and has been subjected on at least one side to corona treatment. The base film comprises a base layer and two covering layers. The base layer comprises polypropylene. The covering layer adjacent the adhesive layer includes polypropylene modified with a natural or synthetic resin having a softening point of about 70° to 170° C., and the other covering layer includes polypropylene modified with a diorganopolysiloxane. The new adhesive tape possesses high values of mechanical properties. The tape has good printability, and it does not contain an adhesion-promoting layer for the adhesive, nor a separating layer (release coat), since such layers are not required. The tape can also be processed without appreciable draw-off noises.

18 Claims, No Drawings

POLYPROPYLENE ADHESIVE TAPE

BACKGROUND OF THE INVENTION

The present invention relates to an adhesive tape comprising a biaxially stretch-oriented polypropylene base film and an adhesive layer. Also, the invention relates to a method for making this tape.

Adhesive tapes based on plastics have been known for a long time. Films most frequently employed are composed of polyvinyl chloride or polypropylene. For this field of use, polypropylene films have the advantage, compared with polyvinyl chloride films, of better resistance to low temperatures, better capacity to withstand heat and lower density and, hence, a lower price per unit area. Disadvantages, in comparison with polyvinyl chloride films, are an inferior pattern of properties in the longitudinal direction, relatively poor printability, the necessity of applying a release coat in an off-line process and/or the necessity of applying an adhesion-promoting layer for the adhesive layer of the adhesive tape and also the considerable and annoying noise of unrolling when the coated film webs are cut into adhesive tapes and when the adhesive tapes are used.

Various possible means of eliminating these individual disadvantages of polypropylene films have already been indicated in the relevant patent literature. However, the individual patent applications and patents only concern themselves with overcoming, in each case, only one disadvantage of those mentioned. For example, German Offenlegungsschrift No. 3,144,911 describes an adhesive tape compossed of a biaxially stretched (oriented) polypropylene base film and an adhesive layer applied on at least one side. No adhesion-promoting layer for the adhesive is required by virtue of the polypropylene base film having been modified with a natural or synthetic resin having a softening point of 70° to 170° C.

A polypropylene film or a polypropylene adhesive tape which does not exhibit any of the disadvantages mentioned above is not yet known.

SUMMARY OF THE INVENTION

It is, therefore, an object of the invention to provide an adhesive tape which includes a polypropylene film which meets all of the important requirements noted above.

A specific object of the present invention is to provide a polypropylene adhesive tape having good mechanical properties and good printability.

Another object of the present invention is to provide a polypropylene adhesive tape of the type described above which does not require a release coat, nor an adhesion-promoting layer for the adhesive.

Yet another object of the present invention is to provide a polypropylene adhesive tape of the type described above which is capable of being processed without the annoying unrolling noises previously mentioned.

In accordance, therefore, with one aspect of the present invention, there is provided an adhesive tape, comprising a three-stage, biaxially stretch-oriented, co-extruded polypropylene base film, which includes a base layer comprising polypropylene, a first covering layer comprising polypropylene and a diorganopolysiloxane as a modifier, and a corona-treated, second covering layer comprising polypropylene and a natural or synthetic resin modifier having a softening point of about 70° to 170° C., and an adhesive layer.

In accordance with another aspect of the present invention there is provided a method for producing an adhesive tape comprising the steps of co-extruding a three-layer polypropylene film comprising a base layer and at least two covering layers, stretch-orienting the three-layer film in at least three stages, heat-treating the stretched film, corona treating at least one surface of the polypropylene film, and roughening at least one surface of the polypropylene film. Preferably, the stretch-orientation involves three stages and is advantageously a biaxial orientation. Most preferably, the co-extruded polymer film is first longitudinally stretched, then transversely stretched, and, finally, longitudinally stretched again.

In accordance with another object of the present invention, there is provided an adhesive tape produced by the process detailed above.

Further objects, features, and advantages of the present invention will become more apparent upon reviewing the detailed description of preferred embodiments which follows.

DETAILED DESCRIPTION OF PREFERRED EMBODIMENTS

In the adhesive tape according to the present invention comprising a biaxially stretched polypropylene base film and an adhesive layer, the base film is a co-extruded, three-layer film having a base layer and two covering layers. The base layer comprises polypropylene, one of the two covering layers comprises polypropylene modified with a diorganopolysiloxane, and the other covering layer, which is intended to receive the adhesive, comprises polypropylene modified with a natural or synthetic resin having a softening point of about 70° to 170° C. The three-layer, co-extruded polypropylene film is biaxially stretch-oriented in at least three stages, and the covering layer intended to receive the adhesive is subjected to corona treatment.

By virtue of the special combination of three selected film layers, namely the base or middle layer and the two covering layers of differing structure in contact with the two sides of the base layer, and also by virtue of the special orientation of the three-layer film caused by stretching in at least three stages, the polypropylene film has a pattern of properties in which all the important advantages of polyvinyl chloride films and all the important advantages of polypropylene films, with regard to the preparation of adhesive tapes, have been combined. The adhesive tape based on this multi-functional polypropylene film has good mechanical properties, especially in the longitudinal direction, possesses good and easy printability, is simply constructed, since it does not have a release coat or an adhesion-promoting layer for the adhesive, and can be processed substantially without noise.

In accordance with a preferred embodiment, the base layer of the base film suggested in accordance with the present invention comprises polypropylene which has been modified with a natural or synthetic resin having a softening point of about 70° to 170° C. The amount of modifying resin is, in general, about 5 to 30% by weight, preferably about 10 to 20% by weight, relative to polypropylene. This modification contributes to an increase in stiffness of the modulus of elasticity.

The preferred polypropylene covering layer modified with a diorganopolysiloxane is a layer which has been subjected on the outer side to corona treatment, whereby an even better printability is achieved. It is also preferable that this layer should also be textured on the outer side, i.e., should have a surface structure which results in a substantial reduction in the noise of unrolling. The polypropylene covering layer which has been modified with a diorganopolysiloxane has, therefore, preferably been subjected to corona treatment or texturizing and, in particular, has been subjected to corona treatment and texturizing.

The amount of diorganopolysiloxane is, in general, about 0.3 to 3% by weight, preferably about 0.5 to 2% by weight, relative to polypropylene.

The polypropylene covering layer adjacent the adhesive layer generally includes about 10 to 50% by weight, preferably about 15 to 40% by weight, of modifying resin, relative to polypropylene. Primerfree coatability with adhesive is achieved as a result of the corona treatment of this covering layer on the side opposite the base layer, i.e., the outer side.

Polypropylene is to be understood as meaning propylene homopolymers, propylene copolymers (block copolymers or random copolymers) or mixtures of propylene homopolymers and/or propylene copolymers. The comonomer content in the copolymers is, in general, up to about 20% by weight, preferably up to about 10% by weight, relative to the copolymer. Suitable comonomers are ethylene and $C_4$ to $C_8$-alphaolefins, preferably $C_4$ to $C_6$-alphaolefins. Preferred grades of polypropylene are, accordingly, propylene homopolymers, preferably isotactic polypropylene, and propylene copolymers containing, as comonomers, ethylene or $C_4$ to $C_6$-alphaolefins, preferably butylene, in an amount of up to about 10% by weight, relative to the copolymer.

The natural or synthetic resins having a softening point of about 70° to 170° C., preferably about 80° to 140° C., (determined as specified in DIN 1995-U4) which are added in order to modify the polypropylene are the known, so-called hard resins. These include the hydrocarbon resins, such as coumarone resins, petroleum resins and terpene resins, ketone resins, polyamide resins, aldehyde resins, such as xylene/formaldehyde resins and naphthalene/formaldehyde resins, dammar resins and colophony.

Coumarone resins are, in most cases, obtained by polymerizing dephenolized and debasified fractions of coal tar light oil, which contain, as unsaturated compounds, indene styrene, dicyclopentadiene, coumarone and homologs thereof, for example. Extensive modification is possible by means of copolymerization, for example with phenol.

The raw materials on which the petroleum resins are based are obtained from the chemical industry by the cracking of naphtha or gas oil to give raw materials, such as ethylene and propylene. These are, for example, resin-forming compounds, such as butene, butadiene, pentene, piperylene, isoprene, cyclopentadiene, dicyclopentadiene, alkylbenzenes, methyldicyclopentadiene, methylindene, naphthalene, styrene, indene, vinyltoluene and methylstyrene.

Terpene resins are polymers of terpenes. Examples of suitable terpenes which may be mentioned include $\beta$-pinene, dipentene, limonene, myrcene, bornylene, camphene and similar terpenes.

The hydrocarbon resins can be modified, for example, by reaction with the raw materials before polymerization, by the introduction of special monomers or by reaction with the polymerized product. A preferred mode of modification is the hydrogenation or partial hydrogenation of unsaturated constituents in the resins.

Dammar resins are obtained by the resinification in vivo of trees of the family Dipterocarpaceae.

Colophony is a natural resin obtained from the crude balsam of conifers (balsam resin), the extract of conifer stumps (root resin) or tall oil (tall resin), and it is essentially composed of abietic acid and isomers thereof. Another possibility is modified colophony, which is formed by polymerizing, hydrogenating, dehydrogenating, oxidizing, decarboxylating, saponifying, esterifying, isomerizing or disproportionating colophony.

Preferred resins having a softening point of about 70° to 170° C., preferably about 80° to 140° C., include styrene polymers, $\alpha$-methylstyrene/styrene copolymers, $\alpha$-methylstyrene/vinyltoluene copolymers, pentadiene polymers, $\alpha$-pinene or $\beta$-pinene polymers, terpene polymers, colophony and modified colophony.

It is preferable to employ diorganopolysiloxanes or polydiorganosiloxanes which have a viscosity of at least about 100 $mm^2$/second, preferably about 1,000 to 30,000 $mm^2$/second, at 25° C. Examples of suitable polydiorganosiloxanes are polydialkylsiloxanes, polyalkylphenylsiloxanes having about 30 to 70% of alkyl groups and 30 to 70% of phenyl groups, olefin-modified siloxane oils, polyether-modified silicone oils, olefin-/polyether-modified silicone oils, epoxy-modified silicone oils and alcohol-modified silicone oils. Among these polydiorganosiloxanes, polydialkylsiloxanes having 1 to 4 carbon atoms in the alkyl group, such as polydimethylsiloxane, and polyalkylphenylsiloxanes having 1 to 4 carbon atoms in the alkyl group, such as polymethylphenylsiloxane, are preferred. Polymethylphenylsiloxane is particularly preferred.

Besides polypropylene and the modifying agents mentioned, the individual layers of the three-layer polypropylene film suggested in accordance with the invention can also contain expedient additives, such as lubricants, anti-static agents, stabilizers and the like.

The preparation of the three-layer polypropylene film suggested in accordance with the present invention is effected by the known co-extrusion process. Within the scope of this process the procedure followed is to co-extrude the melts corresponding to the individual layers of the film through a flat die, to cool the film obtained by co-extrusion in order to solidify it, to stretch-orient the film in at least three stages, preferably in three biaxial stages, and to heat-set the biaxially stretch-oriented film. The three-stage stretch-orientation is preferably carried out in the series longitudinal-transverse-longitudinal, longitudinal-longitudinal-transverse, longitudinal-simultaneously (longitudinal/transverse) or simultaneously (longitudinal/transverse)-longitudinal. The sequence longitudinal-transverse-longitudinal is particularly preferred (it is thus possible to carry out only one stretching in each stage, or it is also possible to carry out two of the stages, namely longitudinal and transverse stretching, simultaneously).

Initially, as in the conventional co-extrusion process, the polymer or the mixture of polymers of the individual layers are therefore compressed and liquified in an extruder. The melts are then forced simultaneously through a flat die (flat sheeting die), and the multi-layer film forced out is cooled and solidified on one or more rollers which are kept at about 30° to 50° C. by cooling. The film thus obtained is then stretched longitudinally and transversely to the direction of extrusion at a temperature below the melting point of the polymer employed. The stretching is performed in at least three stages, preferably in three stages, which results in orientation of the molecular chains. The stretching ratio (total ratio) is preferably about (8 to 12):1 in the longitudinal direction and preferably about (8 to 10):1 in the transverse direction. A higher longitudinal stretching ratio is used in the first longitudinal stretching than in the second and, if appropriate, further longitudinal stretching operation, which is within the range of, preferably, about 5 to 7:1. It is preferable for the temperature of the film in the first longitudinal stretching to be up to about 20° below the temperature at which a clear film is customarily stretched from the same material. The first longitudinal stretching is, accordingly, preferably carried out at a film temperature of about 120° to 130° C. The further longitudinal stretching and the transverse stretching are preferably carried out at a film temperature of about 160° to 170° C. The longitudinal stretching is expediently carried out by means of two rollers running at different speeds corresponding to the stretching ratio desired, and the transverse stretching is carried out by means of a suitable tenter frame. The multi-stage, biaxial stretching of the film is followed by heat-setting heat treatment of the latter. In this treatment the film is kept at a temperature of about 150° to 160° C. for about 0.5 to 10 seconds, preferably about 1 to 5 seconds. The heat-set film is cooled in a conventional manner by being passed over cooling rollers and is wound up by means of a winding device.

Excellent mechanical properties, in particular, high values of the modulus of elasticity in the longitudinal direction, are achieved by means of the multi-stage stretch-orientation described, which is particularly advantageous with respect to the production of adhesive tapes.

For corona treatment, which can be carried out by one of the known methods, it is expedient to follow a procedure in which the film is passed between two conductive elements acting as electrodes. A voltage, in most cases an alternating current voltage, high enough to produce corona discharge, is applied between the electrodes. As a result of this brush or corona discharge, the air above the surface of the film is ionized and combines with the molecules on the surface of the film, so that polar inclusions are formed in the essentially non-polar polymer matrix. The polypropylene base film suggested in accordance with the present invention is subjected to corona treatment on at least one side, specifically on the outer side of the covering layer intended for the reception of the adhesive. In a preferred embodiment, both covering layers are subjected to corona treatment on their outer sides.

The texturization (roughening) of the three-layer polypropylene film can also be carried out by one of the known methods. Within the scope of the process of preparation described above, the desired roughening will be produced via the β-α-crystallite conversion. This is effected by keeping the take-up roll (cooling roll) at a temperature high enough to produce β-crystallites in the layer to be roughened. This temperature is about 70° to 110° C., preferably about 90° to 100° C. The conversion of the β-crystallites into α-crystallites takes place during the heating of the film to the stretching temperature and during the stretching, since the β-crystallites are not stable at this temperature. An intensification of the roughening can be achieved if the first roll of the pair of stretching rolls (in the direction of travel of the film) is a texturized (sand-blasted) roll. In general, it is desirable to have a film surface sufficiently rough for the value determined for the peak-to-valley height $R_z$ (cf DIN 4768) to be about 1 to 8 μm, preferably about 2 to 5 μm.

As far as the thickness of the polypropylene base film suggested in accordance with the present invention is concerned, it has proved advantageous in the preparation of adhesive tapes for the total thickness of the three-layer film to be about 10 to 50 μm, preferably about 20 to 40 μm, with each of the covering layers preferably being about 1 to 5 μm thick.

The adhesives which are known and customary for polypropylene and polyvinyl chloride films are suitable for coating the polypropylene base film suggested in accordance with the present invention with adhesive and, hence, for preparing the adhesive tape according to the present invention. The coating itself is also carried out by one of the known methods. The known rubber and acrylate adhesives have proven particularly suitable as the adhesive for the present polypropylene base film.

The adhesive tape according to the present invention has all the essential properties required from adhesive tapes at the present time. It has good mechanical values, in particular, a high elasticity modulus in the longitudinal direction, and good and easy printability. The tape does not include a release coat; yet, nevertheless, it is readily separable (unrollable); it does not include an adhesion-promoting layer for the adhesive; yet, nevertheless, the latter adheres to the layer so well that it is not torn off when the tape is unrolled, and it does not produce an appreciable unrolling noise. By virtue of the excellent properties which result from the multifunctional structure of the polypropylene base film, the adhesive tape according to the present invention can also be employed in special packaging methods.

The invention will now be illustrated in greater detail by means of examples.

EXAMPLE 1

Using the co-extrusion process, a three-layer polypropylene film having a base layer and two covering layers was extruded at an extrusion temperature of about 260° C. from a flat sheeting die, the melt for the base layer comprising a propylene homopolymer and 10% by weight, relative to the polypropylene, of the synthetic resin, α-methylstyrene/styrene copolymer, having a softening point of 100° C. The melt of one of the two covering layers comprised a propylene homopolymer and 0.5% by weight, relative to the polypropylene, of polymethylphenylsiloxane having a kinematic viscosity of 1,000 mm$^2$/second at 25° C. The melt of the other covering layer comprised a propylene homopolymer and 15% by weight, relative to the polypropylene, of the synthetic resin mentioned. The propylene homopolymer was, in each case, an isotactic polypropylene. The film which had been solidified on the take-up roll was brought to the stretching temperature in a heating passage and was first stretched longitudinally by a factor of 5° at 125° C., then stretched transversely by a factor of 9° at 165° C. and, after the transverse stretching, was again stretched longitudinally by a factor of 2 at a film temperature of 165° C. The subsequent heat-setting was carried out for 5 seconds at 160° C. In order to produce β-crystallites in the polysiloxane-modified polypropylene covering layer with a view to roughening this layer to an $R_z$ value of 2 μm (value of the peak-to-valley height determined as specified in DIN 4768), the take-up roll or cooling roll (the temperature of which is normally 30° to 50° C.) was kept at a temperature of about 95° C. The conversion of the β-crystallites into α-crystallites, and hence the roughening of the surface of the layer to the desired $R_z$ value, took place in the subsequent stretching process. The film was subjected to corona treatment on both sides, specifically at a primary voltage of 200 V and an amperage of 0.5 A. The three-layer polypropylene film was 30 μm thick, the thickness of the base layer being 26 μm and the thickness of each of the covering layers being 2 μm.

EXAMPLES 2 TO 4

The procedure in each case was similar to the procedure of Example 1, but the melts differed from those of Example 1 in regard to the characteristics indicated below:

|  | Example 2 | Example 3 | Example 4 |
|---|---|---|---|
| Base Layer | 20% of resin | no resin | 30% of resin |
| Covering Layer 1 | 2% of polysiloxane | 0.3% of polysiloxane | 3% of polysiloxane |
| Covering Layer 2 | 30% of resin | 10% of resin | 40% of resin |

In contrast with Example 1, the resin employed in Examples 2 and 4 was a synthetic polyterpene resin having a softening point of 125° C., and the polysiloxane employed was a polydimethylsiloxane having a kinematic viscosity of 30,000 mm²/second at 25° C. An adhesive tape was prepared by coating the polypropylene films of Examples 1 to 4 with an adhesive based on acrylate.

The adhesive tapes thus obtained were tested to determine their modulus of elasticity in the longitudinal direction (longitudinal E-modulus) as specified in DIN 53,457, their printability and separability (unrollability), the adhesion of the primer-free acrylate coating and noise on unrolling.

The results are collated in the Table below:

TABLE

| Examples | Longitudinal E-modulus (N/mm²) | Printability | Separability | Adhesion of adhesive | Noise on unrolling |
|---|---|---|---|---|---|
| 1 | 4250 | very good | very good | very good | very slight |
| 2 | 4800 | very good | very good | very good | very slight |
| 3 | 3000 | very good | satisfactory | satisfactory | moderate |
| 4 | 4920 | good | very good | very good | very slight |

What is claimed is:

1. An adhesive tape, comprising:
   a co-extruded polypropylene base film having molecular chains oriented by three-stage biaxial stretching, consisting essentially of:
   a base layer comprising polypropylene,
   a first covering layer comprising polypropylene and a diorganopolysiloxane as a modifier, and
   a corona-treated, second covering layer comprising polypropylene and a natural or synthetic resin modifier having a softening point of from about 70° to about 170° C. wherein said second covering layeer is corona-treated on its surface facing away from said base layer; and
   an adhesive layer applied directly to the corona-treated surface of said second covering layer.

2. An adhesive tape as claimed in claim 1, wherein said second covering layer comprises from about 5 to 30% by weight of said resin, relative to the weight of said polypropylene.

3. An adhesive tape as claimed in claim 2, wherein said second covering layer comprises from about 10 to 20% by weight of said resin, relative to the weight of said polypropylene.

4. An adhesive tape as claimed in claim 1, wherein the softening point of said resin is between about 80° and 140° C.

5. An adhesive tape as claimed in claim 1, wherein said first covering layer comprises from about 0.3 to 3% by weight of said diorganopolysiloxane, relative to the weight of said propylene.

6. An adhesive tape as claimed in claim 1, wherein said corona-treated, second covering layer includes a texturized surface.

7. An adhesive tape as claimed in claim 6, wherein said texturized surface comprises a peak-to-valley height value of from about 1 to about 8 μm, determined as specified in DIN 4768.

8. An adhesive tape as claimed in claim 1, wherein the thickness of said base film is between about 10 and 50 μm, and the thickness of said first and second covering layers is between about 1 and 5 μm.

9. An adhesive tape as claimed in claim 1, wherein said adhesive layer comprises a rubber adhesive.

10. An adhesive tape as claimed in claim 1, wherein said adhesive layer comprises an acrylate adhesive.

11. An adhesive tape as claimed in claim 1, wherein said diorganopolysiloxane is selected from the group consisting of polydialkylsiloxanes, polyalkylphenylsiloxanes having from about 30 to 70% alkyl groups and 30 to 70% phenyl groups, olefin-modified siloxane oil, polyether-modified silicone oils, olefin/polyether-modified silicone oils, epoxy-modified silicone oils and alcohol-modified silicone oils.

12. An adhesive tape as claimed in claim 11, wherein said diorganopolysiloxane is selected from the group consisting of polydialkylsiloxanes having C1–C4 alkyl groups.

13. An adhesive tape as claimed in claim 12, wherein said diorganopolysiloxane comprises polymethylphenylsiloxane.

14. An adhesive tape as claimed in claim 1, wherein said first covering layer further comprises a corona-treated and texturized outer surface.

15. An adhesive tape as claimed in claim 1, wherein said adhesive tape comprises a modulus of elasticity in the longitudinal direction of from about 3000 to about 4920N/mm², determined as specified in DIN 53,457.

16. An adhesive tape as claimed in claim 1, wherein said base layer is disposed between said first and said second covering layers, respectively, and wherein said adhesive layer is disposed on an outer surface of said second covering layer.

17. An adhesive tape as claimed in claim 1, wherein said three-stage biaxial stretching orientation is performed by sequentially stretching said film longitudinally, then transversely, and finally, longitudinally again.

18. An adhesive tape, comprising:
   a three-stage, biaxially stretch-oriented, co-extruded polypropylene base film, which includes:
   a base layer comprising polypropylene, a first covering layer comprising polypropylene and a diorganopolysiloxane as a modifier, and a corona-treated, second covering layer comprising polypropylene and a natural or synthetic resin modifier having a softening point of about 70° to 170° C.; and an adhesive layer, produced by the process comprising the steps of:

co-extruding said three-layer polypropylene film comprising said base layer and at least two covering layers;

stretch-orienting said three-layer film in at least three stages;

heating treating said stretched film;

corona treating at least one surface of said polypropylene film; and roughening at least one surface of said polypropylene film.

* * * * *